Patented Mar. 19, 1935

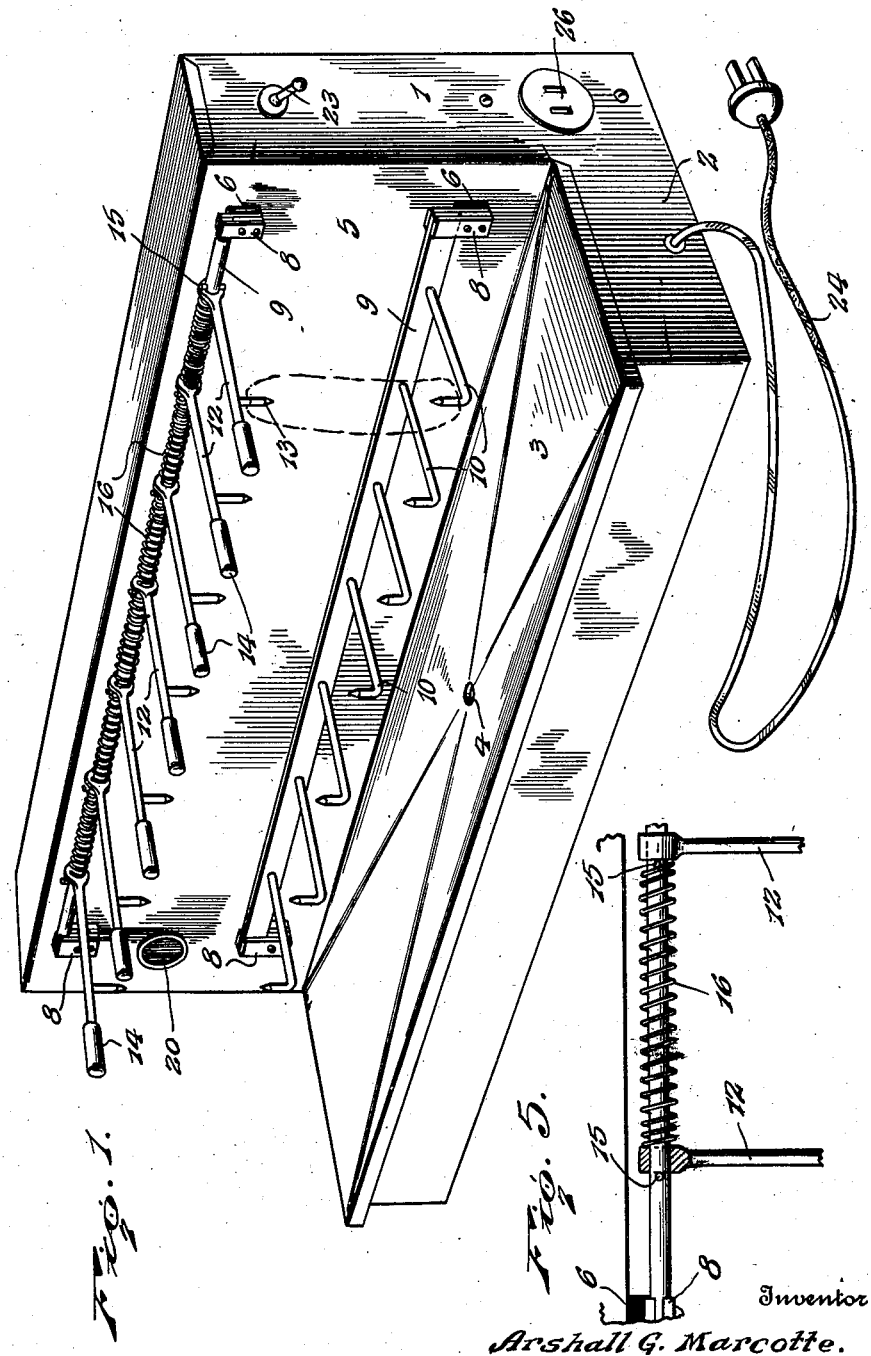

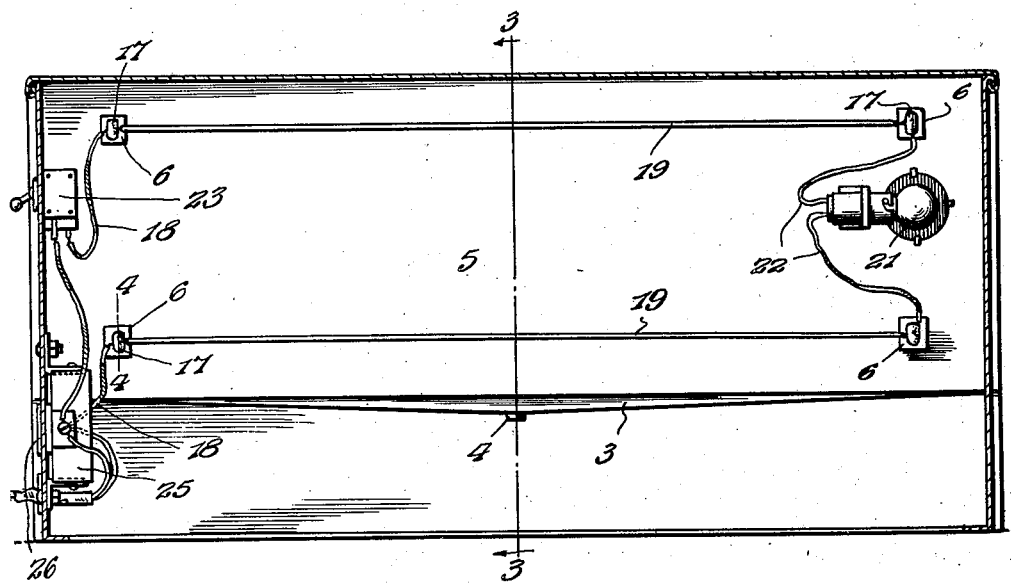
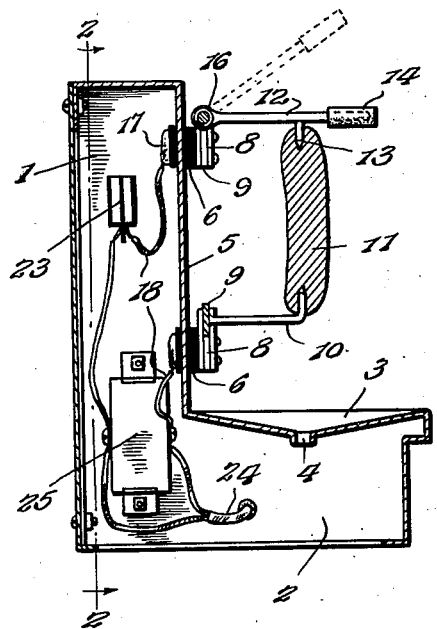
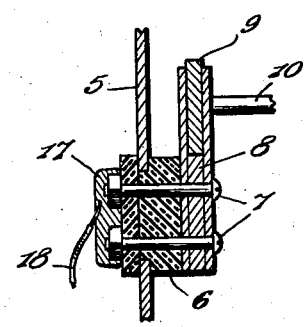

1,994,894

UNITED STATES PATENT OFFICE 1,994,894

ROASTER

Arshall G. Marcotte, Kankakee, Ill., assignor to Noel Manufacturing Company, Inc., Kankakee, Ill., a corporation of Illinois Application January 22, 1932, Serial No. 588,161

4 Claims. (Cl. 219—19)

This invention relates to cooking apparatus and has for its object the provision of a device which is especially adapted for roasting sausages in the open air or in any place where it may be conveniently displayed. Another object of the invention is to provide an apparatus in which the cooking may be performed by an electric current and in which the several parts will be so constructed as to be easily cleaned and maintained in a sanitary condition. Another object of the invention is to provide efficient means for supporting the sausages and maintaining them in the proper position, and a further object of the invention is to provide an apparatus for the stated purpose which will be light and durable and not apt to get out of order. The invention is illustrated in the accompanying drawings and will be hereinafter first fully described and then more particularly defined in the appended claims.

In the drawings, Fig. 1 is a perspective view of an apparatus embodying the present invention, Fig. 2 is a longitudinal vertical section, Fig. 3 is a transverse section on the line 3—3 of Fig. 2, the line 2—2 in Fig. 3 indicating the plane of the section shown in Fig. 2, Fig. 4 is an enlarged detail section on the line 4—4 of Fig. 2, Fig. 5 is a detail sectional elevation of a portion of the sausage-holding devices.

In carrying out the invention there is provided a casing having a rear vertical portion 1 and a lower portion 2 extending horizontally forward from the rear vertical portion and forming a shelf-like structure in front of the vertical portion or back. The casing may be conveniently constructed of sheet metal and a pan 3 is provided to constitute a cover for the lower portion 2, the surface of said pan being inclined from both sides and both ends toward its center whereby the grease and juices dropping thereon will be directed to a central outlet opening 4, and any convenient receptacle may be placed below this pan to catch the juices for such use as may be desired. The vertical back member 1 is closed at its front side by a wall or plate 5 which may be formed integral with the pan 3, as will be understood upon reference to Fig. 3, and in said front wall, adjacent the corners thereof, are openings receiving blocks or bushings 6 of insulation, as shown most clearly in Fig. 4. Bolts 7 are extended through the insulation 6 and secure to the front sides of the respective blocks metallic grips or holders 8 having recesses or notches in their upper ends adapted to receive the ends of bars 9 which fit snugly in said recesses whereby they make good electrical connections therewith and are also firmly held against dislodgement. In the drawings, the lower bar 9 is shown as flat-sided throughout its extent while the upper bar is in the form of a cylindrical rod having flattened tenons at its ends. Fixed to the lower bar and projecting forwardly therefrom at intervals in the length of the same are prongs or holding fingers 10 the ends of which are upturned and pointed whereby they are adapted to pierce the lower ends of sausages, as indicated at 11 in Fig. 3. Mounted loosely upon the upper bar 9 are holding rods 12 which normally project forwardly from the rod and are provided, adjacent their front extremities, with prongs 13 adapted to enter the upper ends of sausages so that the sausages will be held by and between the lower prongs 10 and the upper prongs and will provide paths for the electric current passing between the prongs, as will be understood upon reference to Fig. 3. The holding rods or arms 12 are provided with handles 14 of insulation at their front extremities whereby they may be handled freely and they may swing about the upper bar or rod 9, as will be understood. Disposed at intervals along the length of the upper bar 9 are stop lugs 15 which limit the movement of the respective holding arms in one direction and disposed between the several arms are pressure springs 16 which act upon the respective arms to yieldably hold them against the corresponding lugs and thereby maintain the arms in their proper spaced relation vertically over the cooperating lower prongs 10. While the ends of the conductor bars 9 fit snugly in the grips or holders 8, and are firmly held thereby, they are not fastened in the holders and may consequently be easily lifted therefrom when the apparatus is to be cleaned.

The securing bolts 7 constitute conductors whereby electric current may be transmitted to the respective holders and thence to the conductor bars 9 and within the casing the inner ends of said bolts are connected by a block 17 of conducting material to which one end of a line wire 18 is attached. The block 17 may conveniently be soldered so that the conducting wire will be firmly held and, if preferred, the two upper blocks 17 may be connected by a conducting rod 19 and the two lower blocks connected in a similar manner so that current may be transmitted within the casing to both ends of each bar or rod 9. The casing is provided with a lens 20, if desired, in its front side and a lamp 21 may be disposed immediately back of said lens and supplied with current through wires 22 extending from the adjacent blocks 17, as shown clearly in Fig. 2, so that a bull's eye will be provided which will be illuminated whenever the apparatus is working properly and failure of the lamp to illuminate will notify the attendant that the circuit is broken at some point.

A switch 23 is provided in one end of the casing and controls the flow through one of the conducting wires 18 so that the current may be cut off or turned on at will. Current is to be brought to the apparatus through a cable 24 which may be plugged into an ordinary lamp socket in a well-known manner and passes to a distributer 25 secured within the casing and of any approved form, being illustrated in a conventional manner only. This distributer 25 is shown as including a socket 26 whereby a conducting cable may be plugged into the apparatus to carry current to other devices, such as an illuminated sign.

The construction and arrangement of the several parts being thus made known, it is thought the uses and advantages of the apparatus will be readily understood. As indicated in Figs. 1 and 3, the sausages are secured and held in place, in a vertical position, by and between the prongs 10 and 13 and after all of the prongs have been engaged with sausages the switch 23 is closed so that electric current will pass from the source of supply to the bars or rods 9 and thence through the prongs 10 and holding arms 12 to and through the sausages, the sausages constituting resistances to the flow of the current so that the current will react upon the sausages to disperse heat through the entire bodies thereof and quickly effect roasting of the same. Such juices as are driven from the sausages will drip onto the pan 3 and will be directed to the outlet opening 4 to pass into any suitable receptacle below the pan to be saved for further use. When the sausages have been sufficiently cooked, they may be removed singly by first rocking a holding arm 12 upwardly and then lifting the sausage from the lower prong 10. The arms 12 may be rocked upwardly so as to release the sausages and may be also moved sidewise so that they will not interfere in any way with the removal of the sausage from the lower prongs. When placing sausages in position to be cooked, the sidewise and rotary movement may be imparted to the upper arms so as to facilitate the engagement therewith of the sausages, and the springs 16 acting upon said arms will hold them in proper position while the sausages are cooking. When the device is to be cleaned, the current is, of course, cut off and the bars 9 may then be simply lifted out of the holders 8 thereby permitting them to be very readily scoured and also permitting access to all parts of the holders so that any accumulations thereon may be removed. The casing is thoroughly insulated from the electric conductors at all points where there is any possibility of the casing being charged so that the device may be handled freely without liability of an attendant being shocked. The device is exceedingly simple and compact and will provide not only an efficient cooking apparatus but also a device which will constitute an attractive display to hold the attention of observers and passers by.

Having thus described the invention, I claim,

1. An apparatus for the purpose set forth comprising a frame, clips on the frame disposed in pairs, conductor bars having their ends removably engaged in said clips, upper holding members pivotally mounted for vertical tilting movement on one conductor bar, lower holding members rigidly secured to another conductor bar and disposed in alinement with the pivoted holding members, means on said holding members for supporting articles to be cooked, and means for electrically energizing said bars.

2. Apparatus for the purpose set forth comprising supporting blocks having recesses in their upper ends and disposed in pairs, upper and lower conductor bars having their ends engaged snugly in the recesses in said blocks, means for electrically energizing said bars, prongs carried by the lower bar, and article-engaging and holding arms loosely mounted for tilting movement in a vertical plane upon the upper bar and corresponding in number and position to the prongs on the lower bar.

3. Apparatus for the purpose set forth comprising a lower bar, prongs projecting upwardly from said bar, an upper bar, holding arms loosely mounted on said upper bar whereby to move sidewise and tilt in a vertical plane thereon and provided with depending prongs to cooperate with the first-mentioned prongs to hold articles to be cooked, stops on the upper bar to be engaged by the respective arms, pressure springs cooperating with said stops to yieldably hold the upper arms in position over the respective lower prongs, and means for supplying electric current to the bars.

4. An apparatus for the purpose set forth comprising a casing having a hollow vertical back portion and a hollow lower portion projecting forwardly from said back portion, a drip pan supported on the forwardly projecting lower portion and forming a closure for the top thereof, bars secured to the exterior of the vertical portion of the casing above the drip pan, relatively stationary and movable food impaling elements carried by the bars, and means for supplying electric current to said bars.

ARSHALL G. MARCOTTE. [L. S.]